United States Patent [19]

Norris et al.

[11] 4,403,682
[45] Sep. 13, 1983

[54] CLUTCH CONTROL APPARATUS

[75] Inventors: Peter J. Norris, St. Bees; Frederick J. Parker, Rugby; Harry M. Windsor, Harbury Leamington Spa, all of England

[73] Assignee: Automotive Products Limited, Leamington Spa, England

[21] Appl. No.: 235,581

[22] Filed: Feb. 18, 1981

[30] Foreign Application Priority Data

Feb. 18, 1980 [GB] United Kingdom ............... 8005373

[51] Int. Cl.³ .............................................. B60K 41/02
[52] U.S. Cl. ............................. 192/0.033; 192/0.076; 192/3.58
[58] Field of Search ............... 192/0.076, 0.096, 0.075, 192/0.07, 0.033, 0.032, 3.57, 3.58, 103 R; 74/866

[56] References Cited

U.S. PATENT DOCUMENTS

| 3,215,234 | 11/1965 | Hirano | 192/0.076 |
| 3,709,340 | 1/1973 | Murakami et al. | 192/3.58 |
| 3,752,284 | 8/1973 | Brittain et al. | 192/3.58 |
| 4,261,229 | 4/1981 | Mizuno et al. | 74/866 |
| 4,267,914 | 5/1981 | Saar | 192/0.034 |
| 4,294,341 | 10/1981 | Swart | 192/0.073 |
| 4,295,551 | 10/1981 | Zimmerman et al. | 192/0.076 |

FOREIGN PATENT DOCUMENTS

| 706853 | 4/1954 | United Kingdom . |
| 1449543 | 9/1976 | United Kingdom . |
| 1465325 | 2/1977 | United Kingdom . |
| 1543386 | 4/1979 | United Kingdom . |
| 2080909 | 2/1982 | United Kingdom ............ 192/0.032 |

Primary Examiner—George H. Krizmanich
Attorney, Agent, or Firm—Kemon & Estabrook

[57] ABSTRACT

A vehicle automatic clutch control comprising an engine speed sensor that produces a signal $V_1$, an electrical reference signal generator that produces a signal $V_R$ and a comparator that processes the two signals $V_1$ and $V_R$ to produce an error signal E. The error signal E is utilized for controlling a clutch actuator that operates the clutch to vary the state of engagement of the clutch to alter the engine speed and equalize the two signals $V_1$ and $V_R$ and thus maintain a substantially constant engine speed until the clutch is fully engaged.

4 Claims, 3 Drawing Figures

CLUTCH CONTROL APPARATUS

This invention relates to clutch control apparatus for the automatic control of friction clutches between the engine and transmission of motor vehicles on take up from standing start.

In its broadest aspect the present invention provides an automatic clutch control system in which there is provided means for generating a constant, varying, or variable reference signal for comparison with an engine speed signal and clutch position control means.

Accordingly, there is provided a vehicle transmission clutch control system comprising an electrical engine speed sensor and signal means, an electrical reference signal generator that produces a reference signal, a comparator which receives the reference and engine speed signals and produces an error signal which is utilised for controlling an actuator that operates the clutch to vary the state of engagement of the clutch to alter the engine speed with subsequent variation of the engine speed signal to approach equivalence with the reference signal so as to equalise said signals thus maintaining a substantially constant engine speed until the clutch is fully engaged.

Preferably means are provided to adjust the reference signal depending upon the torque demand upon the engine of the vehicle so that as the vehicle torque demand increases the reference signal is caused to correspond with a higher engine speed.

The invention will be described by way of example and with reference to the accompanying drawings in which.

Figure 1:
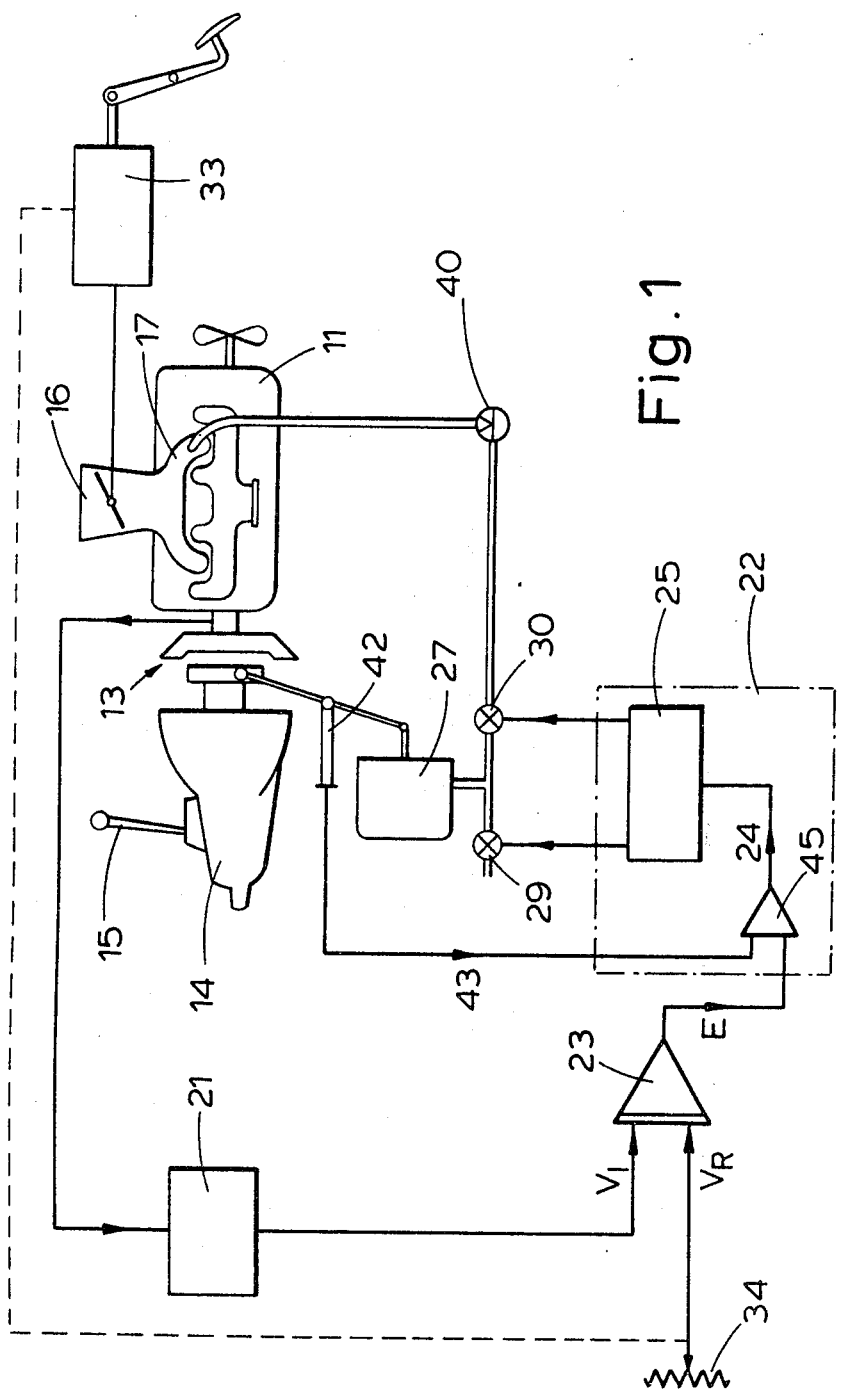
FIG. 1 is a schematic drawing of a clutch control system according to the invention.

With reference to FIG. 1 of the drawings a conventional motor car has the usual engine 11, clutch 13, gearbox 14, gearshift lever 15, throttle 16 and an inlet manifold 17.

Figure 2:
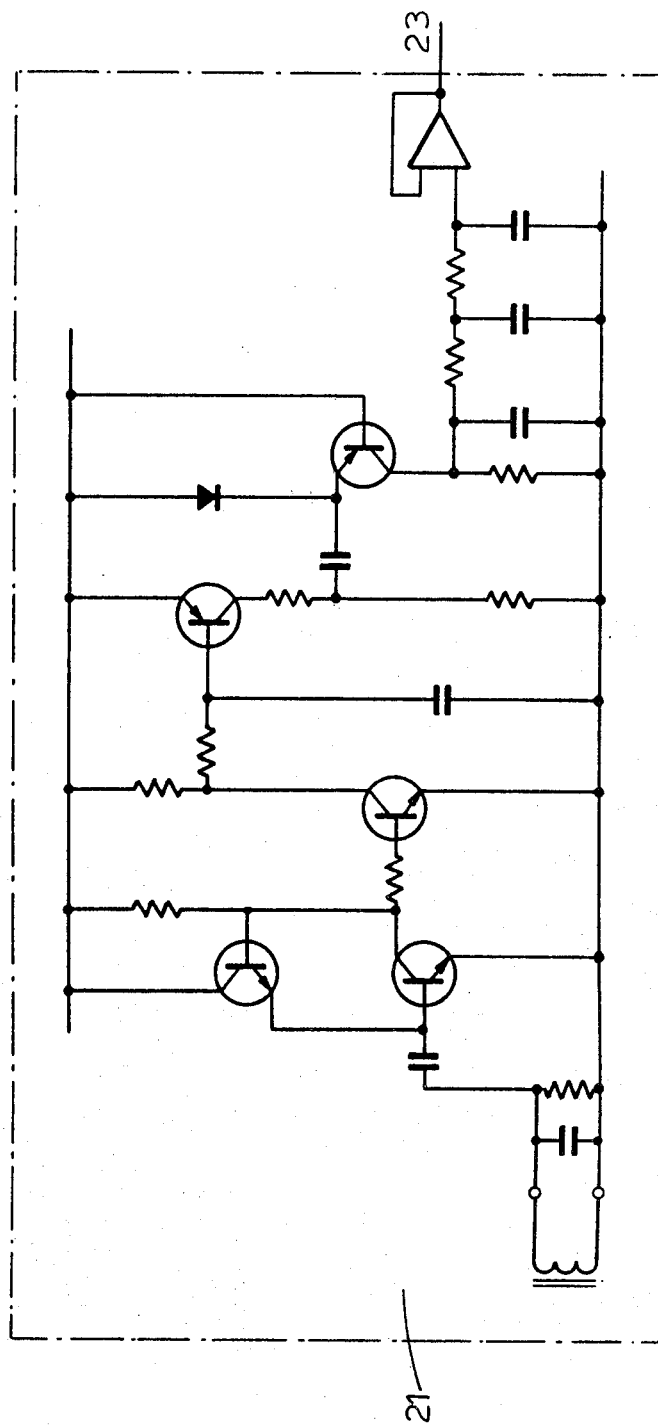
FIG. 2 is a detailed circuit of the engine speed sensor in FIG. 1.

The engine speed is sensed by a sensor 21 which has means for producing a voltage signal $V_1$ representative of engine speed. The sensor circuit is illustrated in FIG. 2 and is basically a magnetic probe sensing the teeth on the engine flywheel and a transistor pump circuit. The voltage signal $V_1$ is fed to a comparator 23 which measures the difference between the voltage $V_1$ and a voltage signal $V_R$ which is obtained from a reference signal generator 34, which is for example a potentiometer across the vehicle battery. The reference signal $V_R$ can be set to be the same value as a signal obtained via the sensor 21 at a particular engine speed for example 1000 r.p.m.

An error signal E is derived from the comparator 23 and is fed into a clutch position control 22 which controls the operation of an actuator 27. The actuator 27 operates the vehicle clutch 13 and is powered by means which may be pneumatic, hydraulic or electrical.

The clutch position control 22 comprises an actuator control 25, a clutch position transducer 42, and a comparator 45. The position transducer 42 is coupled to the actuator output and produces a voltage signal 43 representative of the position of the clutch. This signal 43 is fed into the comparator 45 for comparison with a command signal constituted by the error signal E. The difference signal 24 from the comparator 45 is fed into the actuator control.

Taking a pneumatic actuator 27 by way of example, the actuator 27 may be connected to a vacuum source, for example, the inlet manifold 17 of an internal combustion engine 11, via solenoid valve 30, and non-return valve 40, causing the actuator 27 to move to engage the clutch. Alternatively the actuator 27 may be connected to atmosphere through solenoid valve 29 causing the actuator to move to release the clutch under the influence of an internal spring located in the actuator.

Figure 3:
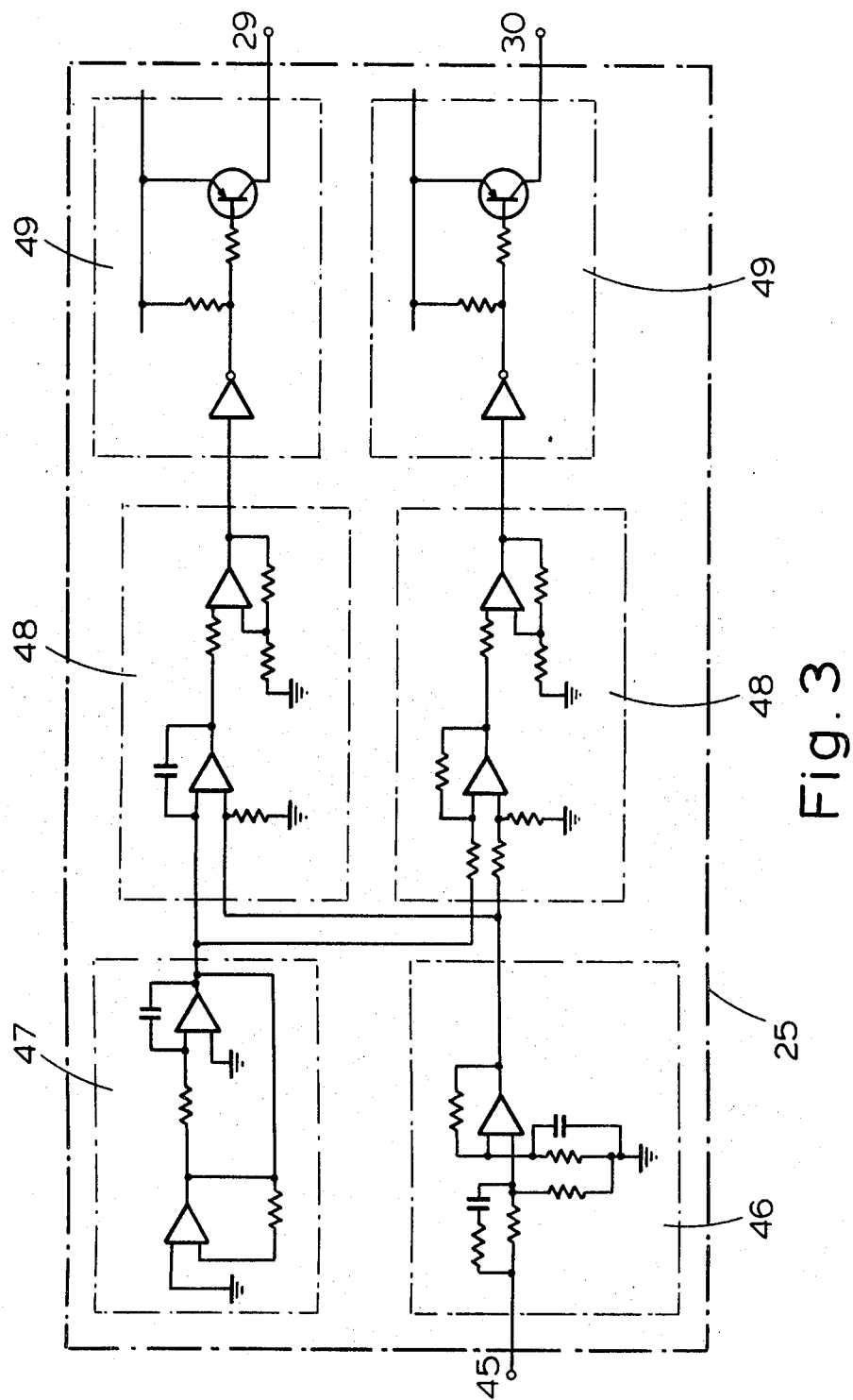
FIG. 3 is a detailed circuit of the actuator control utilised in the system of FIG. 1.

The actuator control 25 is shown in detail in FIG. 3, and includes a mark space ratio modulator. The control causes either valve 29 or 30, depending upon the polarity of the difference signal 24, to be switched on and off rapidly at a fixed rate. The open time of these valves 29 and 30 is dependent on the amplitude of the difference signal 24. The open time for either valve 29 or 30 determines the velocity of the actuator 27 in the appropriate direction so that the actuator velocity is proportional to the difference signal 24. The actuator 27 operates so as to equalise the position signal 43 and the error signal E and reduce the difference signal 24 to zero. Consequently the actuator takes up a position dictated by the error signal E.

The error signal E determines the degree of engagement of the clutch. The clutch position control 22 operates the actuator 27 so as to vary the state of engagement of the clutch 13 with the engine 11 and thereby alter the engine speed to cause the engine speed signal $V_1$ to approach equivalence with the reference signal $V_R$ and make the error signal E approach zero.

When the engine speed signal $V_1$ is lower than the reference signal $V_R$ the clutch is disengaged. When $V_1$ is equal to $V_R$ the clutch is part engaged and when $V_1$ is greater than $V_R$ the clutch is fully engaged. The range of engine speed over which engagement takes place is determined by the overall system amplification. The degree of exactitude with which the error signal E approaches zero is determined by the gain in the system, i.e. the higher the gain the greater the exactitude. In addition, engagement of the clutch will load the engine, resulting in a reduction of speed and consequently more gradual clutch engagement.

The operation of the clutch control apparatus is as follows:

From a standing start, the clutch position control 22 causes the clutch actuator 27 to disengage the clutch by venting the actuator to atmosphere through valve 29.

If the driver places the gearshift lever into first, or possibly second gear then, as the driver operates the throttle control 33 to increase the engine speed, once the engine speed increases so that the voltage $V_1$ approaches the reference voltage $V_R$ the actuator 27 will begin to engage the clutch 13. The error signal E activates the clutch position control 22 which in turn operates the actuator 27 so as to move the clutch 13 into engagement with the engine 11 to increase the torque load upon the engine through the friction clutch. This has the effect of reducing the engine speed and bringing $V_1$ close to $V_R$.

The driver will recognise the fall in engine speed and further open the throttle, hence increasing $V_1$ which in turn causes the clutch to further engage. This process of increasing the throttle opening and holding the engine speed steady by engagement of the clutch will continue until the clutch is fully engaged.

The slow increase in the rate of engagement of the clutch ensures a smooth take-up of the clutch, and hence a smooth starting by the vehicle. When the vehicle is moving and the clutch fully engaged the engine speed will rise as the driver increases the throttle opening. When the engine speed exceeds some threshold speed, for example, 2000 r.p.m., the position control 22 causes the disengagement speed to be reduced to a value lower than the original engagement speed so that engine speeds lower than the original engagement speeds are permissible when in higher gears.

In order to make the control system responsive to varying torque demands from the engine, for example, hill starts or towing a caravan, it is necessary to make the reference signal vary accordingly, so that as the torque demand for a standing start increases (i.e. so that the engine does not stall), then the reference signal becomes equivalent to a higher engine speed.

One simple method of doing this is to utilise a variable potentiometer 34 fitted to the vehicle throttle control 33 as the reference generator, so that as the throttle opening increases the reference signal also increases and becomes equivalent to a higher engine speed. The connection between the throttle control 33 and the reference signal potentiometer 34 is shown by dotted lines in the drawing. The reference signal to throttle opening curve is not necessarily linear, and is shaped to give a maximum value at 50% of throttle opening.

The control circuit shown in FIG. 3 consists of an amplifier and phase advance, 46 and oscillator 47, two mark space ratio modulators 48 and two outputs 49. The outputs 49 are connected to the valve 29 and 30. The terminals for the control are numbered with the reference numerals of the components to which they are connected.

We claim:

1. A vehicle transmission clutch control system comprising;
   an engine speed sensor;
   means for producing an engine speed signal derived from the engine speed sensor;
   generator means for producing a reference signal;
   first comparator means arranged to receive and compare said speed signal and the reference signal and produce a consequent error signal;
   a clutch actuator for operating the clutch to vary the state of engagement of the clutch with the vehicle engine;
   a clutch actuator control for controlling the clutch actuator;
   a clutch position transducer connected to the clutch actuator to produce a clutch position signal indicative of the state of engagement of the clutch; and
   second comparator means arranged to receive and compare said error signal and the clutch position signal and produce a difference signal which is supplied to the actuator control.

2. A control system as claimed in claim 1, wherein means are provided to adjust the reference signal depending upon torque demand upon the engine of the vehicle so that as the torque demand increases the reference signal is varied to correspond to a higher engine speed.

3. A control system as claimed in claim 2, wherein said means whereby the reference signal is adjusted, is constituted by the use of a variable potentiometer as the reference signal generator, said potentiometer being operated off the throttle control.

4. A control system as claimed in claim 3, wherein the output signal from said potentiometer gives a maximum reference signal value at 50% throttle opening.

* * * * *